Patented July 8, 1952

2,602,754

UNITED STATES PATENT OFFICE 2,602,754

PRODUCTION OF HIGH-TEMPERATURE HEAT INSULATING MATERIAL

Herbert Abraham, New York, N. Y., assignor to The Ruberoid Co., New York, N. Y., a corporation of New Jersey No Drawing. Application December 18, 1948, Serial No. 66,144

5 Claims. (Cl. 106—86)

This invention relates to an improved high temperature heat insulation material and method of making the same. By the term "high temperature heat insulation material" is meant a material that has an efficient thermal insulation range up to about 1250° F.

One of the objects of the invention is to provide a heat insulation material of low density, good mechanical strength, and that can withstand temperatures up to 1250° F. without disintegration, or appreciable impairment of any of its physical characteristics and properties.

Another object is to provide a novel and economical method of making the material that results in a stronger product, and that greatly reduces the time element of manufacture of the finished product.

In the manufacture of the insulation, the composition in the form of a thickened slurry is poured into molds of suitable size and shape to form blocks, pipe coverings, laggings, slabs, or the like. The molds are then placed in an autoclave or like steam-tight receptacle where the silica and calcium components of the slurry react chemically to form calcium silicate, and the composition is cured. The steam-indurated product is firm, strong, and has shape-stability, by which I mean that it is capable of maintaining its molded shape without deformation on handling. The product is then removed from the mold, thoroughly dried, and finally trimmed and cut to size and shape.

Heretofore in the manufacture of calcium silicate insulations the autoclaving cycle has taken a minimum of 10 hours and generally longer. This is uneconomical in that it ties up the molds for a long period of time. According to the present invention the time of the complete autoclaving cycle is reduced to 7 hours or less, thus releasing the molds sooner and decreasing the cost of manufacture.

This result is due principally to the use in the composition or slurry of a silica component consisting principally of ground silica sand and diatomaceous earth, in the proportion of about three parts of silica sand to one part of diatomaceous earth. The calcium component consists mainly of pulverized quicklime, or the like.

High temperature insulating materials made from calcium oxide and a silicate, such as silica sand, in a water slurry have high strength (modulus of rupture) but are too hard and brittle to be used as a satisfactory commercial product. Insulating materials made from a water slurry of calcium oxide and diatomaceous earth, unless of limited water content and made under high pressure, are relatively weak, that is, they have a low modulus of rupture and are too soft to be shipped or handled without excessive breakage.

I have found that by using a silica component consisting of pulverized sand and diatomaceous earth in the ratio above mentioned, namely about three parts of silica to about one part of diatomaceous earth, I am able to produce a product of satisfactory strength and good workability, and with the surprising result that the time of the autoclaving cycle is reduced about 33⅓% or more, effecting a marked economy in the cost of production.

The reaction of hydrated lime and silicon dioxide, such as sand, diatomaceous earth, etc., is a surface reaction. The sand used is preferably ground to a fineness of about 140 mesh, and the diatomaceous earth is used in the form of very fine particles of minute size. For instance, where a blend or mixture of diatomaceous earth with a specific surface area of 30,000 sq. cm./gr. and silica sand with a specific surface area of 3200 sq. cm./gr. are used, a more perfect surface contact is secured than where either is used alone. The mixture of pulverized sand and diatomaceous earth has been found to produce a much stronger insulating material than that previously produced. This result is believed to be due principally to the fact that different sizes of silicon dioxides are more closely compacted and bound together in the surface reaction of calcium hydrate and silicon dioxide.

One important characteristic of a commercially satisfactory light-weight high temperature insulation material is that it should have a minimum strength or modulus of rupture of three times the weight or density of the material. That is to say a block weighing 12 lbs. per cubic foot should have a modulus of rupture of at least 36 lbs. per square inch. The insulation of the present invention complies with that requirement.

Another important requirement for commercial acceptance of an insulation material of this type is that it should have good "hinging." This means that when the pipe covering or block is partially cut or cracked in handling, it will still hold together and not fall apart. This result is obtained by using suitable classes and grades of asbestos fibers in proper proportion. This is an important factor because too high a content of asbestos fiber is uneconomical, while too low a content will not give sufficient strength or afford proper hinging.

A further requirement is that the finished molded product should be of substantially uniform density throughout, that is to say that it should have practically no density stratification. By "density stratification" is meant the difference in density between the top and bottom sections of a molded block. In making the block the slurry is poured into pans or molds. The solids of the slurry have a tendency to settle, while the water has a tendency to rise to the surface and separate. This action is known as "syneresis" and is overcome by incorporating suspending agents in the slurry, such as bentonite, or other gel former. With use of proper suspending agents, the solids of the slurry will not settle.

In the manufacture of the product, it has been found that the best practice is to make the calcium oxide slurry first and then to add properly opened asbestos fiber to the slurry. In this manner some of the slurry is absorbed by capillarity into the asbestos fiber with the result of effecting an intimate bond of the fiber in the composition during the subsequent calcium silicate reaction.

The calcium oxide is preferably used in the form of quicklime, which is first slaked in water, and the slurry is kept cool, below 100° F., so as to get the calcium hydrate in solution, the latter being more soluble in cool than in hot water. The fiber is added slowly to the calcium hydrate slurry, with continuous mixing or stirring. The fiber is a mixture of various kinds of asbestos fibers and of different lengths. With use of diatomaceous earth it has been found that the ratio of long fiber (which is the more expensive) to short fiber may be changed without any material reduction in strength of the finished product. In general the asbestos fiber constitutes from about 12% to 18% of the total solids.

The silica is then added to and thoroughly mixed in the slurry. This component, as has heretofore been stated, consists of a mixture of finely ground silica sand and diatomaceous earth in the proper proportion. The diatomaceous earth and lime react at low temperatures, below 212° F., forming calcium hydrosilicate. This reaction is quite fast. When heated under steam pressure the reaction is accelerated, and it takes only from four to five hours to be completed. The silica sand and lime, when autoclaved or heated under steam pressure, react to form calcium hydrosilicate, a very strong binder, but this reaction does not start until a temperature of about 250° F. is reached, and is relatively slow taking from about eight to ten hours to complete. The mixture, however, of diatomaceous earth and silica sand in the ratio of about 1:2 cuts down the autoclaving time materially.

While diatomaceous earth is the preferred active silica used, other active silicas may be used with silica sand, such for example as tufa, infusorial earth, tripolite, volcanic earth, novaculite, rottenstone, sistoff, or the like.

In forming the slurry of the calcium and silica components, the temperature should be kept below 100° F. throughout. If the temperature rises even only to about 140° F. the calcium silicate reaction in the presence of diatomaceous earth or other active silica will start and make the slurry too heavy or viscous for satisfactory pouring into the molds.

The slurry is poured into molds which are placed in an autoclave and subjected to a holding or sustaining steam pressure of about 140–150 pounds. The autoclaving action takes place in three continuous steps or phases, namely a period in which the steam pressure is gradually raised, a period in which it is held substantially constant, and a period in which it is gradually reduced. The entire length of the complete cycle is about 7 hours, of this cycle the holding period is about from 4 to 5 hours in duration. A 7 hour cycle lends itself to efficient and economical production because when running a plant on three shifts a day, the autoclaves can be loaded and unloaded three times within each twenty-four hours.

In the production and trimming of the product some waste inevitably occurs. It has been found that because of the faster reaction caused by use of diatomaceous earth or other active silica, it is feasible to incorporate an amount of waste, up to about 13.5%, in the composition. This reduces the material costs and tends to eliminate the problem of waste disposal.

In the practice of the invention, I may add magnesium sulphate and pressure hydrated dolomite to the slurry from which the product is made. Addition of those substances gives the finished insulation material a feel and softness simulating that of the well known 85% magnesia insulation. While either magnesium sulphate or pressure hydrated dolomite may be used alone, it has been found more desirable and economical to use both of these ingredients in the slurry.

The following is a formula of the solid ingredients of the slurry from which the product is made:

|  | Percentage |
|---|---|
| Calcium oxide, pulverized quicklime | 23.5 –27 |
| Asbestos fiber | 12.25–18 |
| Ground silica sand | 30.25–41 |
| Diatomaceous earth | 10.3 –13.6 |
| Bentonite | 0– 5 |
| Waste | 0–13.3 |
| Magnesium sulphate | 3– 3.4 |
| Pressure hydrated dolomite | 2– 5 |

A sufficient amount of water is used to produce a slurry that can be poured into the molds, and that will result in a lightweight, low density product after the composition has been autoclaved and dried. Usually the ratio of solids to water is in proportion of about 18.5–19% solids to about 81–81.5% water.

The finished insulation material has the following characteristics:

| | |
|---|---|
| Density lbs. per sq. ft. | 13–14.25 |
| Modulus of rupture lbs. per sq. in. | 44–94 |
| Hardness mm | 0.43–0.75 |
| Abrasion: | |
| After first 10 minutes per cent | 8.7–22.3 |
| After second 10 minutes do | 14.8–53.9 |
| Changes under soaking heat: | |
| Hardness mm | 0.62–0.78 |
| Loss in weight per cent | 8–8.75 |
| Linear shrinkage do | 0.67–0.80 |
| Thermal conductivity: | |
| K-factor, 200° F. mean temperature | 0.406 |
| K-factor, 300° F. mean temperature | 0.470 |
| K-factor, 400° F. mean temperature | 0.532 |
| K-factor, 500° F. mean temperature | 0.595 |
| K-factor, 550° F. mean temperature | 0.628 |

What I claim is:

1. The method of making a lightweight strong heat-insulating material capable of insulating temperatures up to about 1250° F., which comprises forming a slurry of pulverized slaked quicklime, asbestos fibers, silica sand ground to about 140 mesh, and diatomaceous earth, in which the ratio of silica sand to diatomaceous earth is about 3:1, adding to the slurry at least one substance from the group consisting of pressure hydrated dolomite and magnesium sulphate, stirring the slurry to mix the ingredients thoroughly and keeping the temperatures below 100° F., pouring the slurry into molds, and subjecting the slurry while in the molds to steam pressure in an enclosed receptacle for a period of not more than about seven hours to react the calcium and silica chemically and to cure the product, removing the cured product from the molds, and thoroughly drying the product.

2. The method set forth in claim 1, wherein the substance added to the slurry is pressure hydrated dolomite.

3. The method set forth in claim 1, wherein the substances added to the slurry are both magnesium sulphate and pressure hydrated dolomite to the slurry.

4. The method set forth in claim 1, which includes the step of adding to the slurry waste material produced in making the product up to an amount of about 13.5% of the total solids.

5. The method as in claim 1, wherein a minor proportion of bentonite as a suspending agent is added to the slurry.

HERBERT ABRAHAM.

REFERENCES CITED

The following references are of record in the file of this patent:

UNITED STATES PATENTS

| Number | Name | Date |
|---|---|---|
| 1,590,132 | Teitsworth | June 22, 1926 |
| 2,400,884 | Lloyd | May 28, 1946 |
| 2,421,721 | Smith | June 3, 1947 |
| 2,432,981 | Abrahams | Dec. 23, 1947 |
| 2,469,379 | Fraser | May 10, 1949 |